(12) United States Patent
Ioannou

(10) Patent No.: US 8,991,050 B2
(45) Date of Patent: Mar. 31, 2015

(54) HIGH WEAR DURABILITY ALUMINUM GRAVURE CYLINDER WITH ENVIRONMENTALLY SAFE, THERMALLY SPRAYED PRE-COAT LAYER

(75) Inventor: Ioannis Ioannou, Oinofyta (GR)

(73) Assignee: Artio SARL, Sousse (TN)

( * ) Notice: Subject to any disclaimer, the term of this patent is extended or adjusted under 35 U.S.C. 154(b) by 108 days.

(21) Appl. No.: 13/510,597

(22) PCT Filed: Nov. 9, 2010

(86) PCT No.: PCT/GR2010/000052
§ 371 (c)(1),
(2), (4) Date: May 17, 2012

(87) PCT Pub. No.: WO2011/073695
PCT Pub. Date: Jun. 23, 2011

(65) Prior Publication Data
US 2012/0240400 A1    Sep. 27, 2012

(30) Foreign Application Priority Data
Dec. 15, 2009 (GR) .................................. 090100690

(51) Int. Cl.
| | |
|---|---|
| *B41N 1/20* | (2006.01) |
| *C25D 5/48* | (2006.01) |
| *B41B 1/20* | (2006.01) |
| *B41N 3/03* | (2006.01) |
| *C25D 5/10* | (2006.01) |
| *C25D 5/44* | (2006.01) |
| *C25D 7/04* | (2006.01) |

(52) U.S. Cl.
CPC ... *C25D 5/48* (2013.01); *B41B 1/20* (2013.01); *B41N 1/20* (2013.01); *B41N 3/038* (2013.01); *C25D 5/10* (2013.01); *C25D 5/44* (2013.01); *C25D 7/04* (2013.01)
USPC ........... 29/890.1; 428/34.1; 205/50; 205/296; 29/895.32; 29/895

(58) Field of Classification Search
CPC ....................................................... B41N 1/20
USPC ............... 29/890.1, 888.06, 888.061, 895.32, 29/895; 205/296, 50; 428/341
See application file for complete search history.

(56) References Cited

U.S. PATENT DOCUMENTS

| | | | |
|---|---|---|---|
| 2,495,941 A | 1/1950 | Mondolfo | |
| 2,871,171 A | 1/1959 | Atkinson | |
| 3,294,889 A * | 12/1966 | Downie et al. | ................ 264/255 |

(Continued)

*Primary Examiner* — Peter DungBa Vo
*Assistant Examiner* — Kaying Kue
(74) *Attorney, Agent, or Firm* — Nixon Peabody LLP; Khaled Shami

(57) ABSTRACT

The present invention describes a method for manufacturing rotogravure cylinders with a cylinder base made of a light weight material like aluminum. The method involves the surface treatment of the cylinder with mechanical means, the copper plating in an appropriate solution, the engraving of the cylinder, and the hardening of the cylinder by chromium plating. The advantage of this method is that the chemical treatment for the preparation of the cylinder surface which generates hazardous waste is replaced by a mechanical process. In addition, the reduction of the cylinder weight considerably (e.g. for aluminum base cylinder the weight reduction is two thirds of the weight of a steel base cylinder) reduces significantly the transportation costs. Moreover, the adhesion of the copper layer to be engraved is improved and the cost and time of manufacturing reduced.

1 Claim, 1 Drawing Sheet

(56) References Cited

U.S. PATENT DOCUMENTS

| | | | |
|---|---|---|---|
| 4,007,680 A * | 2/1977 | Pfleger et al. | 101/153 |
| 4,334,966 A | 6/1982 | Beach | |
| 4,391,879 A * | 7/1983 | Fabian et al. | 428/551 |
| 4,662,045 A * | 5/1987 | Grodum | 29/895.212 |
| 4,781,801 A | 11/1988 | Frisby | |
| 4,993,320 A * | 2/1991 | Kochsmeier | 101/148 |
| 5,191,703 A * | 3/1993 | John | 29/895.32 |
| 5,372,697 A * | 12/1994 | Akutsu et al. | 205/50 |
| 5,417,841 A | 5/1995 | Frisby | |
| 5,860,469 A * | 1/1999 | Barlow | 164/98 |
| 6,048,446 A * | 4/2000 | Michaelis | 205/127 |
| 7,153,408 B1 | 12/2006 | Herdman | |
| 2002/0079228 A1 | 6/2002 | Smith | |
| 2003/0000086 A1* | 1/2003 | Fuganti et al. | 29/888.061 |
| 2006/0236543 A1* | 10/2006 | Felgenhauer et al. | 29/895.2 |
| 2011/0056397 A1* | 3/2011 | Nishikawa et al. | 101/375 |

\* cited by examiner

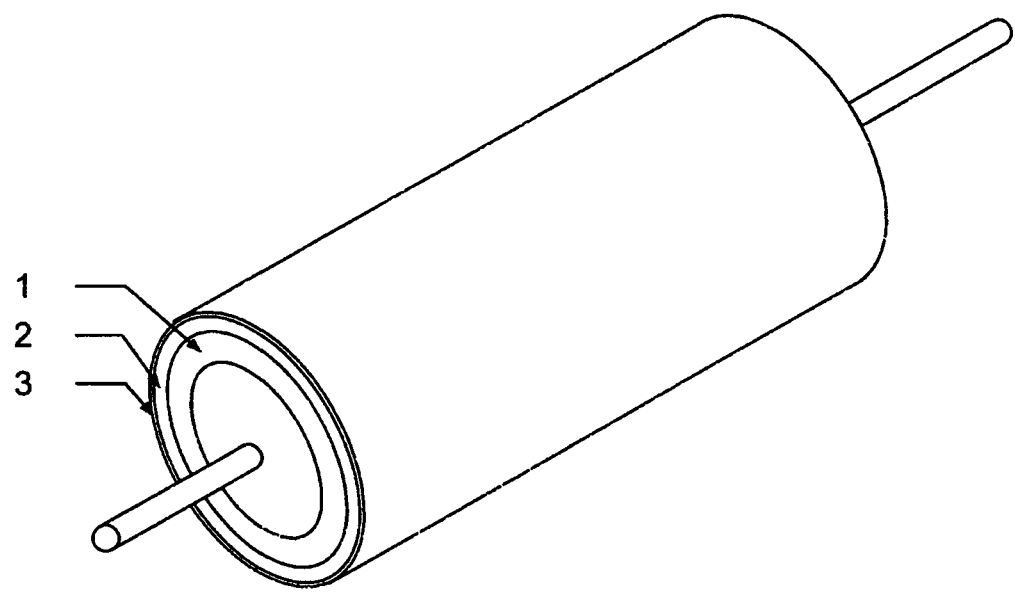

HIGH WEAR DURABILITY ALUMINUM GRAVURE CYLINDER WITH ENVIRONMENTALLY SAFE, THERMALLY SPRAYED PRE-COAT LAYER

CROSS REFERENCE TO RELATED APPLICATIONS OR PRIORITY CLAIM

This application is a National Phase of PCT/GR2010/000052, filed Nov. 9, 2010, entitled, "METHOD OF MANUFACTURING ROTOGRAVURE CYLINDERS WITH ALUMINUM BASE", which claims the benefit of GR2009/0100690, filed Dec. 15, 2009, the contents of which are incorporated herein by reference in their entirety.

The present invention refers to a method for manufacturing rotogravure cylinders used in the printing industry for the printing of packaging materials (by transfer of ink from the printing cylinder to the packaging material). Gravure cylinders consist of the base of the cylinder (see FIG. 1 which shows such a cylinder), which is usually made of cold drawn or hot finished steel (1, FIG. 1), a copper layer (2, FIG. 1) usually 0.5 to 1 mm thick and a layer of chromium usually 6 to 8 $\mu$m (3, FIG. 1). In FIG. 1 the dimensions of the layers (base of cylinder, copper layer and chromium layer) are not in scale and they are only shown for descriptive purposes.

The copper layer is electroplated on the base of the cylinder (i.e. the steel) and forms the surface which is engraved or etched either by chemical or electromechanical (diamond) or electronic (laser) method with the pattern which will be printed (transferred) on the packaging material (like paper, plastic film, aluminum, etc). The copper is the dominant surface used for engraving because it is easy to engrave.

The chromium layer on the engraved cylinder protects the surface of the cylinder from the pressure exerted by the doctor blade on the printing cylinder during the printing process (transfer of ink onto the packaging material).

The cylinder body is usually made of steel which satisfies the requirements for precision and small deflection required in the printing process. Alternatively for the printing industry, the cylinder body can be manufactured from a light weight metal like aluminum which is much lighter than steel (aluminum has specific weight of about 2700 kg/m$^3$, while steel has a specific weight of about 7800 kg/m$^3$). Using aluminum as the cylinder base results in a lighter rotogravure cylinder (by about one third) which means significant reduced transportation costs and safer handling during production phases. However, aluminum is an electrochemically passive material and it is quite challenging to copper plate it.

The present invention is about the process of manufacturing gravure cylinders for the printing industry with cylinder bodies made of aluminum. The term aluminum in the present invention refers to pure aluminum, aluminum with small addition of other materials or aluminum alloys.

The method for electrolytic plating of the body of the cylinder which is made of steel or aluminum includes the following phases:

(a) The manufacturing of the cylinder body made of steel or aluminum.

(b) Surface pretreatment of the cylinder body. When the cylinder base is aluminum, the surface pretreatment for the next phase is done using a chemical process (this process is described in many inventions like U.S. Pat. No. 2,871,171) and includes washing the cylinder with de-ionized water and consequently generation of hazardous waste. In addition to these drawbacks, adhesion of the copper (plated in the next phase) is also problematic. When the base of the cylinder is made of steel, then in this phase the cylinder is degreased by electrolysis. This process is described (at least) in invention U.S. Pat. No. 2,871,171.

The pre-copper plating of the cylinder is achieved in a solution of alkali copper for the preparation of the surface of the cylinder to be able to achieve the copper plating in the next phases. Since copper which is electroplated with acidic electrolyte does not plate on steel, the surface of the cylinder body is prepared by plating a thin copper layer in alkali solution. Alternatively, the steel bases are initially electroplated with a nickel layer.

c) After the pre-copper plating follows the finishing of the cylinder surface with sandpaper and the cylinder surface cleaning with de-ionized water which produces hazardous waste.

(d) To prepare the cylinder surface for engraving, the cylinder is then copper plated as described in invention U.S. Pat. No. 2,871,171 and others.

(e) Copper plating is followed by finishing of the cylinder surface in a lathe and the cylinder engraving (with chemical or electromechanical or electronic method) with the pattern and text required by the printer.

(f) The final phase of the rotogravure cylinder manufacturing is the chromium plating and the super-finishing of the cylinder surface.

The details of each separate phase of the above described methodology, as well as the factors which affect the processes which have been listed above in each separate phase, have been described in detail in a number of inventions.

The efforts of aluminum copper plating goes back in time to the invention of U.S. Pat. No. 2,495,941, where the inventor with the same electrolytic solution from strong acid forms an anodic coating on aluminum and a deposit of copper over the anodic coating in the same solution merely by using the aluminum as an anode while forming the coating and then as a cathode when depositing the copper.

Invention U.S. Pat. No. 2,871,171 describes a method to overcome the difficulty caused by the presence of the oxide film on aluminum or its alloys by electroplating copper from suitable mildly acid solutions following a simple alkaline degreasing operation only. Such solutions would be able to dissolve sufficient of the oxide film to permit good adhesion of the deposited copper to the original aluminum.

Invention U.S. Pat. No. 3,294,889 describes a method for producing a rotogravure printing cylinder having as the printing surface thereof a thin layer of photosensitized polymeric material and to the printing cylinder produced by such method.

Invention U.S. Pat. No. 4,781,801 presents the most common method of electroplating a layer of copper on steel gravure rolls especially adapted to receive electronic engraving.

Invention U.S. Pat. No. 7,153,408 presents an improved copper plating bath for depositing a copper layer onto a printing cylinder which has a stable hardness and is free from self-annealing during high speed plating.

Invention U.S. Pat. No. 5,417,841 describes a unique plating bath formulation which results in a surface coating which is ideally suited for electronic engraving.

Invention U.S. Pat. No. 2002/0079228 describes a method and an apparatus which preferably utilizes rectifiers that are able to pulse direct current several hundred times per second in order to repeatedly and intermittently establish an electric field between a supply of plating material and the gravure cylinder.

The present invention has the advantage of achieving copper electroplating of a cylinder base made of aluminum which reduces the weight of the cylinder by about two thirds (compared with the cylinder made of steel) without the complicated chemical process for the preparation of the cylinder surface which produces hazardous waste with significant environmental impacts and with the high cost of safely disposing them.

In addition, the preparation of the aluminum cylinder base which will be described below in detail results in stable copper layer with excellent adhesion on the aluminum surface.

The present invention describes a method for manufacturing rotogravure cylinders with a cylinder body made of aluminum without the chemical pretreatment process for the preparation of the cylinder surface which produces hazardous waste. Instead of the chemical process, the preparation of the cylinder surface is done with an environmental friendly mechanical process (e.g. with thermal spraying), with excellent adhesion of the plated copper layer which will be engraved and with a reduction of the time and manufacturing cost of the entire process.

The manufacturing of gravure cylinders with a base made of aluminum includes the following steps:

(a) The production of the gravure cylinder base made of aluminum. The base of the cylinder is produced from an aluminum tube—to achieve reduction of the weight of the final gravure cylinder—to the dimensions required by the printer.

(b) After the cylinder body production, the cylinder's surface roughness is increased by a mechanical mean (e.g. with sand paper, sandblasting, etc).

(c) At this phase, the cylinder is prepared with a thermal spraying process to achieve a layer of copper coating with a thickness of about 10-50 μm. This copper layer will become the substrate to achieve the electroplating with a copper layer which will be engraved in the next phase. Instead of copper, the substrate can be nickel, brass, etc or a combination of them.

(d) The next phase is the finishing of the cylinder surface with sandpaper of about 400 mesh.

(e) In the next phase electroplating of the cylinder (without hardener) takes place which coats the cylinder with a layer of copper of about 100-300 μm in thickness in a solution of copper sulfate (200-230 gr $CuSO_4 \times 5H_2O$) and sulfuric acid (60-65 gr $H_2SO_4$ per liter of solution). The hardness of the copper layer must be lower than 200 HV (100-120 HV recommended). During the electroplating, the cylinder is revolved with a speed of about 100 rpm. The current density during electroplating ranges from 10 to 20 amps/dm$^2$ for about 50-150 min and with a solution temperature maintained at about 30° C.

(f) To prepare the surface of the cylinder for engraving, the surface of the cylinder then is electroplated with a copper layer of about 200 μm thickness in a solution of copper sulfate (200-230 gr $CuSO_4 \times 5H_2O$) and sulfuric acid (60-65 gr $H_2SO_4$ per liter of solution) and a catalyst for hardness. The catalyst does not have any particular properties and can be found easily in the market.

Similar ranges for the solutions mentioned above (steps e & f) are referred in a number of inventions like U.S. Pat. No. 4,334,966, U.S. Pat. No. 4,781,801 and more. Copper hardness in this phase must be higher than 200 HV so that engraving can be achieved. During the plating, the cylinder is revolved with a speed of about 100 rpm. The current density during electroplating in this phase ranges from 20 to 25 amps/dm$^2$ for about 80-100 min and with a solution temperature maintained at about 30° C.

(g) In the next stage, the cylinder is processed in a lathe for the achievement of a specific diameter (the diameter required by the printer) and is polished with special finishing wheels on a rectifier to achieve a surface roughness $R_z$ of about 0.03 to 0.07 mm.

(h) After polishing, the cylinder is engraved (with chemical, electromechanical or electronic method) with the pattern and text required by the printer.

(i) The final phase of the gravure cylinder manufacturing involves the chromium plating of the cylinder with a chromium coating layer of about 6 to 10 μm in a chromium oxide solution (250-280 gm of $Cr_2O_3$ per solution liter) and sulfuric acid (2.5-2.8 gm of $H_2SO_4$ per solution liter) for about 30 min.

Although the above description is the recommended methodology for the manufacturing of a light weight gravure cylinder with a base made of aluminum, it is apparent to the experts of the field that small deviations or alterations or modifications can be implemented without significant deviations from the present invention.

The invention claimed is:

1. A method for manufacturing a gravure cylinder used to transfer ink onto packaging material, the gravure cylinder including a layer of hard copper for engraving a pattern and a layer of chromium for hardening and resistance to wear, the method comprising:

roughening the cylinder surface of an aluminium base cylinder by mechanical means;
pre-coating the cylinder surface with 10-50 μm copper using thermal spraying;
finishing the cylinder surface with sandpaper of 400 mesh;
electroplating with a copper layer of 100-300 μm without hardener;
electroplating with a copper layer of at least 200 μm with a catalyst for hardness;
polishing the cylinder surface;
engraving the cylinder; and
chromium plating the cylinder surface with a coating of 6-10 μm.

* * * * *